United States Patent [19]

Yokoyama

[11] Patent Number: 4,866,671
[45] Date of Patent: Sep. 12, 1989

[54] SYSTEM FOR STORING STARTING ADDRESSES OF A BUFFER RAM AND DIFFERENT FONTS OF A CHARACTER ROM UPON ENERGIZATION OF THE PRINTER

[75] Inventor: Takashi Yokoyama, Kodaira, Japan

[73] Assignee: Citizen Watch Co., Ltd., Tokyo, Japan

[21] Appl. No.: 235,734

[22] Filed: Aug. 22, 1988

Related U.S. Application Data

[63] Continuation of Ser. No. 829,604, Feb. 14, 1986, abandoned.

[30] Foreign Application Priority Data

Feb. 15, 1985 [JP] Japan .................................. 60-26331

[51] Int. Cl.⁴ ........................ G06F 12/02; G06F 3/12
[52] U.S. Cl. ................................. 364/900; 364/930.4; 364/948.91; 364/960; 364/960.7; 364/519; 400/63; 400/70; 400/121
[58] Field of Search ... 364/200 MS File, 900 MS File, 364/519; 400/63, 76, 121, 279, 70

[56] References Cited

U.S. PATENT DOCUMENTS

| | | | |
|---|---|---|---|
| 3,964,591 | 6/1976 | Hill et al. | 400/72 X |
| 4,245,308 | 1/1981 | Hirschman et al. | 364/200 |
| 4,403,303 | 9/1983 | Howes et al. | 364/900 |
| 4,575,827 | 3/1986 | Kulakowski | 365/230 |
| 4,585,360 | 4/1986 | Ueda | 400/63 |
| 4,615,631 | 10/1986 | Ueda et al. | 400/63 X |
| 4,617,650 | 10/1986 | Morimo et al. | 365/195 |
| 4,629,342 | 12/1986 | Fritaki | 400/121 |
| 4,660,998 | 4/1987 | Tsuneki | 400/121 X |
| 4,737,923 | 4/1988 | Matsuzaki et al. | 364/519 |

Primary Examiner—David Y. Eng
Assistant Examiner—Thomas C. Lee
Attorney, Agent, or Firm—Lowe, Price, Leblanc, Becker & Shur

[57] ABSTRACT

Successive addresses of a character generator ROM, a buffer RAM and an empty area in an address space of a memory in a printer are sequentially searched upon energization of the printer. An identification code and a start address of each of a plurality of character sets stored in the character generator ROM, and start and end addresses of the buffer RAM are detected and stored for printer operation data. The character generator ROM and the buffer RAM can be expanded in the empty area.

10 Claims, 3 Drawing Sheets

4,866,671

SYSTEM FOR STORING STARTING ADDRESSES OF A BUFFER RAM AND DIFFERENT FONTS OF A CHARACTER ROM UPON ENERGIZATION OF THE PRINTER

This application is a continuation of application Ser. No. 829,604, filed Feb. 14, 1986, now abandoned.

BACKGROUND OF THE INVENTION

The present invention relates to a method and apparatus for utilizing a memory in a printer connected to a host computer or the like.

A conventional printer is known which is connected to a host computer or the like to store output data from the host computer or the like in a memory and to perform printing on the basis of the storage data. A built-in memory of a conventional printer of this type typically has a memory structure (i.e., address mapping), as shown in FIG. 4. Referring to FIG. 4, reference symbol M denotes a memory, and its address space consists of address 0000 to address FFFF. The least significant address location is assigned to a control ROM 1 for storing a printer control program. The upper address locations are then sequentially assigned to a character generator ROM 2 for storing printing characters, a working RAM 3 used for data processing or the like, and a data reception buffer RAM 4 for receiving data from a host computer or the like. The most significant address location is defined as an empty space 5. With this memory allocation, even if the empty space 5 is used as an expansion memory area, either the buffer memory or the character generator memory is expanded. Therefore, it is very difficult to expand both the buffer RAM and the character generator ROM.

SUMMARY OF THE INVENTION

It is an object of the present invention to provide a method and apparatus for utilizing a memory in a printer, wherein the conventional drawbacks can be eliminated, and a buffer RAM and a character generator ROM can be freely expanded within the range of the memory space.

According to the present invention, a character generator ROM, a buffer RAM and an empty area are allocated in a memory of a printer at a continuous address space. At the same time, the buffer RAM as a whole is allocated at a continuous address. At the beginning of printer operation, addresses of the character generator ROM, the buffer RAM and the empty area are sequentially searched to detect and store an identification code and start address of a character set for each font in units of printing quality stored in the character generator ROM, and start and end addresses of the buffer RAM. The character generator ROM and the buffer RAM can be easily and simply expanded in the empty area as needed. Therefore, a limited memory capacity can be effectively utilized. A compact and inexpensive printer having a ROM and/or RAM of desired capacities can be obtained.

DETAILED DESCRIPTION OF THE PREFERRED EMBODIMENTS

Figure 1:
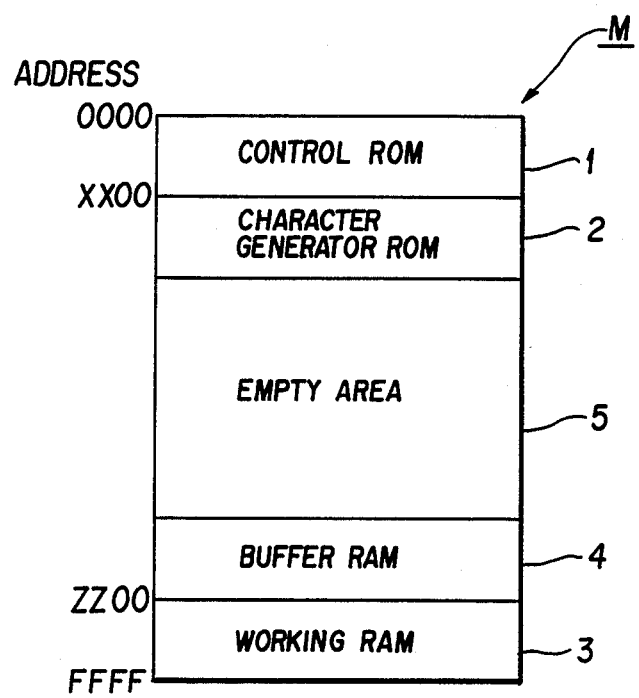
FIG. 1 shows a memory structure of a printer memory according to a first embodiment of the present invention.
Figure 4:
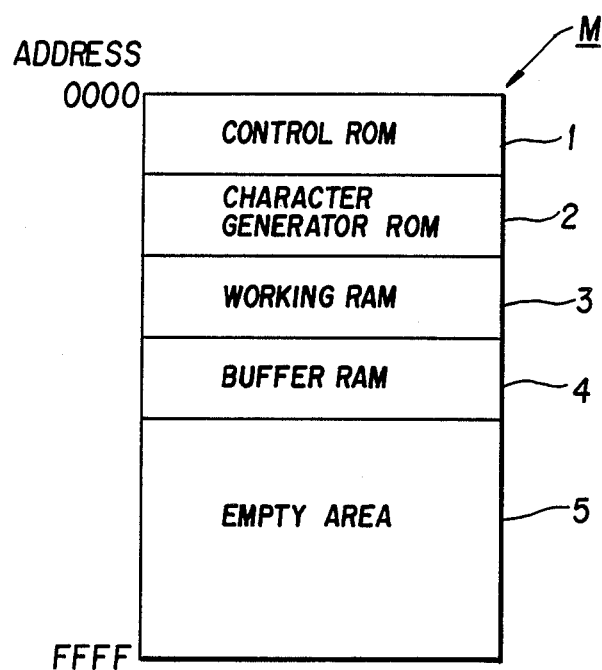
FIG. 4 shows a memory structure of a conventional printer memory.

FIG. 1 shows a memory structure, i.e., address mapping of a memory incorporated in a printer adapting a memory utilization method according to an embodiment of the present invention. Reference numeral 1 denotes a control ROM for storing a control program; 2, a character generator ROM; 3, a working RAM; 4, a data reception buffer RAM for receiving data from a host computer or the like; and 5, an empty area. The elements 1 to 5 constitute a memory M. Address areas in FIG. 1 are respectively assigned to the elements 1 to 5. The memory areas adjacent to the empty area 5 are respectively assigned to the character generator ROM 2 and the buffer RAM 4. The memory M in the printer has mounting slots (not shown) for mounting the elements 1 to 4 on the memory M in accordance with the memory configuration.

The character generator ROM 2 consists of a standard surface-mounted character generator ROM (to be referred to as a standard ROM hereinafter), or the standard ROM with an expansion ROM for expanding the standard ROM. The standard ROM stores, for example, one DP font character set for rough printing for data processing, and one NLQ font character set for printing like precision printing with types. The expansion ROM stores, for example, another DP or NLQ font character set different from those stored in the standard ROM, and other font character sets compatible with the printing capability of the printer. According to this embodiment, the expansion ROM is mounted in a mounting slot adjacent to that of the standard ROM and is assigned with an address area next to that of the standard ROM. Similarly, the buffer RAM 4 consists of a standard surface-mounted buffer RAM (to be referred to as a standard RAM hereinafter), or the standard RAM with an expansion RAM for expanding the standard RAM. In order to expand the buffer RAM 4, the expansion RAM is mounted next to the standard RAM such that their address spaces are continuous. Therefore, the character generator ROM 2 as a whole is allocated at a continuous address area in the memory space in the memory M. At the same time, the buffer RAM 4 is also allocated at a continuous address area in the memory space.

Commands for specifying a desired printing quality such as a DP font and an NLQ font and a desired font of a character set so as to cause the printer to be compatible with the printing qualities and the fonts and to specify an expanded font character set. For example, a command is exemplified such that the printing quality is a DP font and a third font character set is used.

Figure 2:
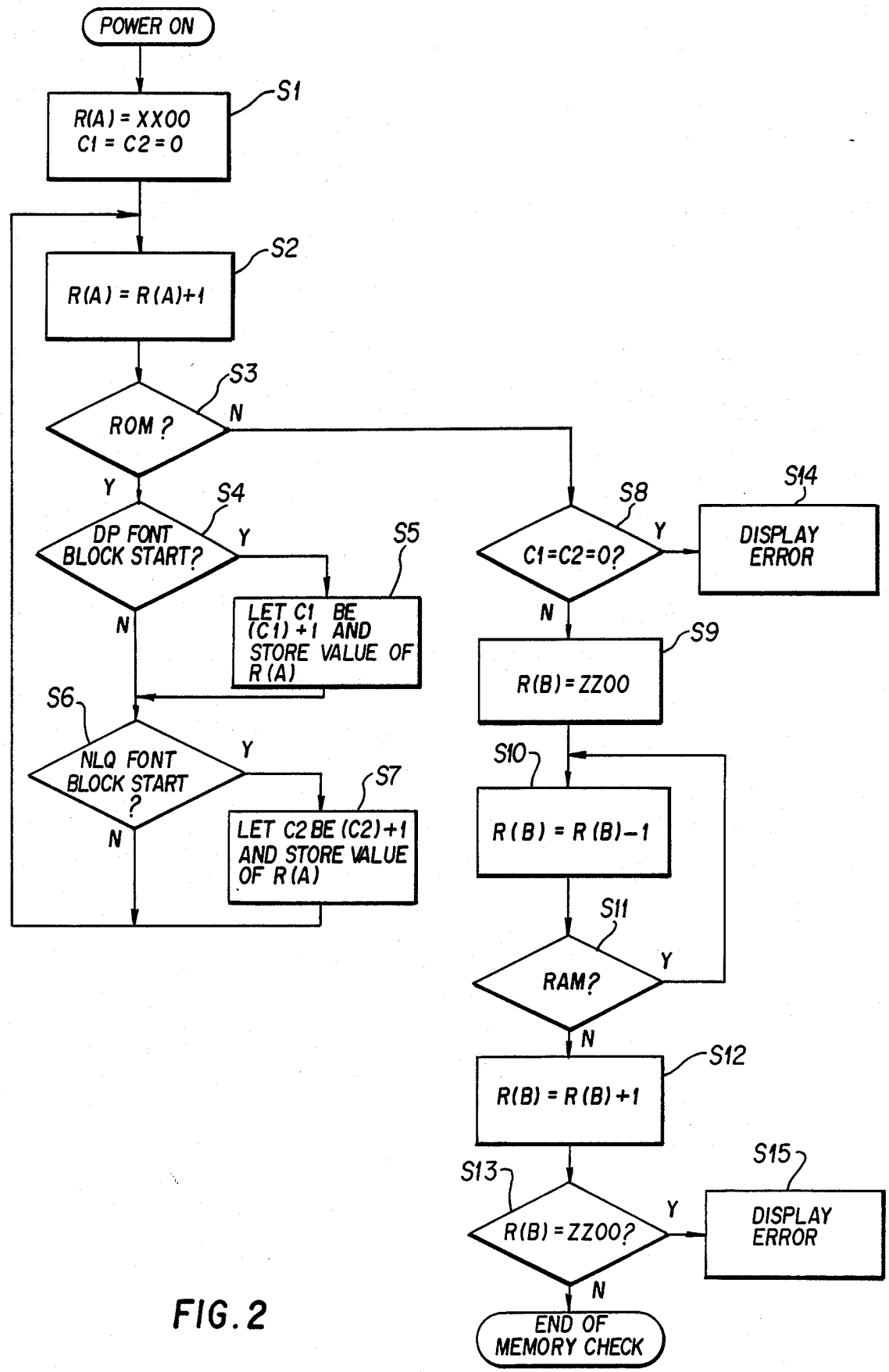
FIG. 2 is a flow chart of operation executed by a printer controller with the memory structure in FIG. 1.

When the printer is powered, a central processing unit (to be referred to as a CPU hereinafter; not shown) constituting the printer controller performs the operation according to a flow chart of FIG. 2. The CPU accesses the character generator ROM 2 in the memory M in the printer to search and store a character set identification code and a start address of a character set for each font and each printing quality in the character generator ROM 2, and a start address of the buffer RAM 4, thereby causing the printer to be compatible with the operation even if the character generator ROM 2 and the buffer RAM 4 are expanded.

More particularly, when the printer is powered, the CPU sets in a register R(A) therein address XX00 lower by one from the start address of the standard character generator ROM, setting counters C1 and C2 for the respective printing qualities compatible with the printer performance to "0" (step S1. In this embodiment, the printer is compatible with the DP font for rough printing in data processing and the NLQ font for printing like precision printing with types, and can perform printing with either font. The counter C1 is arranged to identify the respective character sets of the DP font. The counter C2 is arranged to identify the respective character sets of the NLQ font (it should be noted that if the printer can perform printing with other fonts, the corresponding counters must be increased) (step S1.

The register R(A) is incremented by one (step S2). The CPU checks whether the ROM is mounted at the address represented by the register R(A) (step S3). Since the standard ROM is allocated at the upper address area in the memory space in the memory M, the count of the register R(A) at the beginning represents a space of the ROM 2. The ROM is thus detected, and the flow advances to step S4. It is checked by a known technique whether the address represented by the register R(A) is the start address of the DP font block in the ROM 2 (step S4). If YES in step S4, the count of the DP font counter C1 is incremented by one. At the same time, the value of the register R(A) upon detection of the start position of the DP font block is stored as a start address of the first character set of the DP font in a location for storing font data in the working RAM (step S5). The flow then advances to step S6. However, if NO in step S4, the flow advances to step S6. The CPU checks in step S6 whether the value of the register R(A) represents a start address position of the NLQ font in the ROM 2. If YES in step S6, the NLQ font counter C2 is incremented by one. The value of the register R(A) is stored as the start address of a first character set of the NLQ font character sets start address in the location for storing font data in the working RAM, and the flow returns to step S2 (step S7). If NO in step S6, the flow returns to step S3, and the operations in steps S2 to S7 are repeated.

When the CPU determines in step S3 that the count of the register R(A) does not represent a ROM, the CPU checks in step S8 whether or not the counts of both the counters C1 and C2 are "0". In this case, if both the counters C1 and C2 are set to be "0", no character sets are stored in the memory M. In other words, neither the standard character generator ROM nor the expansion character generator ROM are mounted in the printer. The printer cannot perform the prescribed functions, and an error is displayed (step S14). If either or both of the counts of the counters C1 and C2 are "1", end address ZZ00 of the standard RAM is set in a buffer start address register R(B) (step S9). The register R(B) is then decremented by one (step S10). The CPU checks whether the RAM is mounted at the address represented by the value of the register R(B) (step S11). As long as the RAM 4 is detected, the operations in steps S10 and S11 are repeated. However, if NO in step S11, i.e., when the end address of the empty area 5 is searched, the value of the register R(B) at this moment is incremented by one (step S12), so that the value of the register R(B) represents the start address of the buffer RAM 4. The CPU then checks that the value of the register R(B) is the initial value, i.e., end address ZZ00 of the standard RAM (step S13). If YES in step S13, error display is performed (step S15) since the CPU determines that no buffer RAM 4 is mounted in the printer.

In this embodiment as described above, the character generator ROM 2 and the buffer RAM 4 are adjacent to the empty area 5 so as to sandwich the area 5 in the memory space of the memory M. The memory areas of the character generator ROM 2 and the buffer RAM 4 can be expanded from the upper and lower address sides of the empty area 5. In addition, upon energization of the printer, the character set identification code and the start address of a character set for each font and each printing quality in the character generator ROM 2, and the start address of the buffer RAM 4 are detected and stored. Therefore, the character generator ROM 2 and the buffer RAM 4 can be arbitrarily expanded within the memory area of the memory M.

In the above embodiment, the lower address space is assigned to the character generator ROM 2, and the upper address space is assigned to the buffer RAM 4. However, the lower address space can be assigned to the buffer RAM 4, and the upper address space can be assigned to the character generator ROM 2. In this case, the operation flow in FIG. 2 must be slightly modified, but a detailed description thereof will be omitted since it is apparent from the above description.

In the embodiment and modification described above, the standard character generator ROM and the standard buffer RAM are mounted at the time of shipping. However, the standard ROM and RAM need not be mounted at this time. The user may select a desired combination for the empty area 5.

In the above embodiment and its modification, the lower/upper address space is assigned to the character generator ROM 2, and the upper/lower address space is assigned to the buffer RAM 4, while the address spaces thereof sandwich that of the empty area 5. However, a continuous address space can be assigned to at least the buffer RAM 4.

Figure 3:
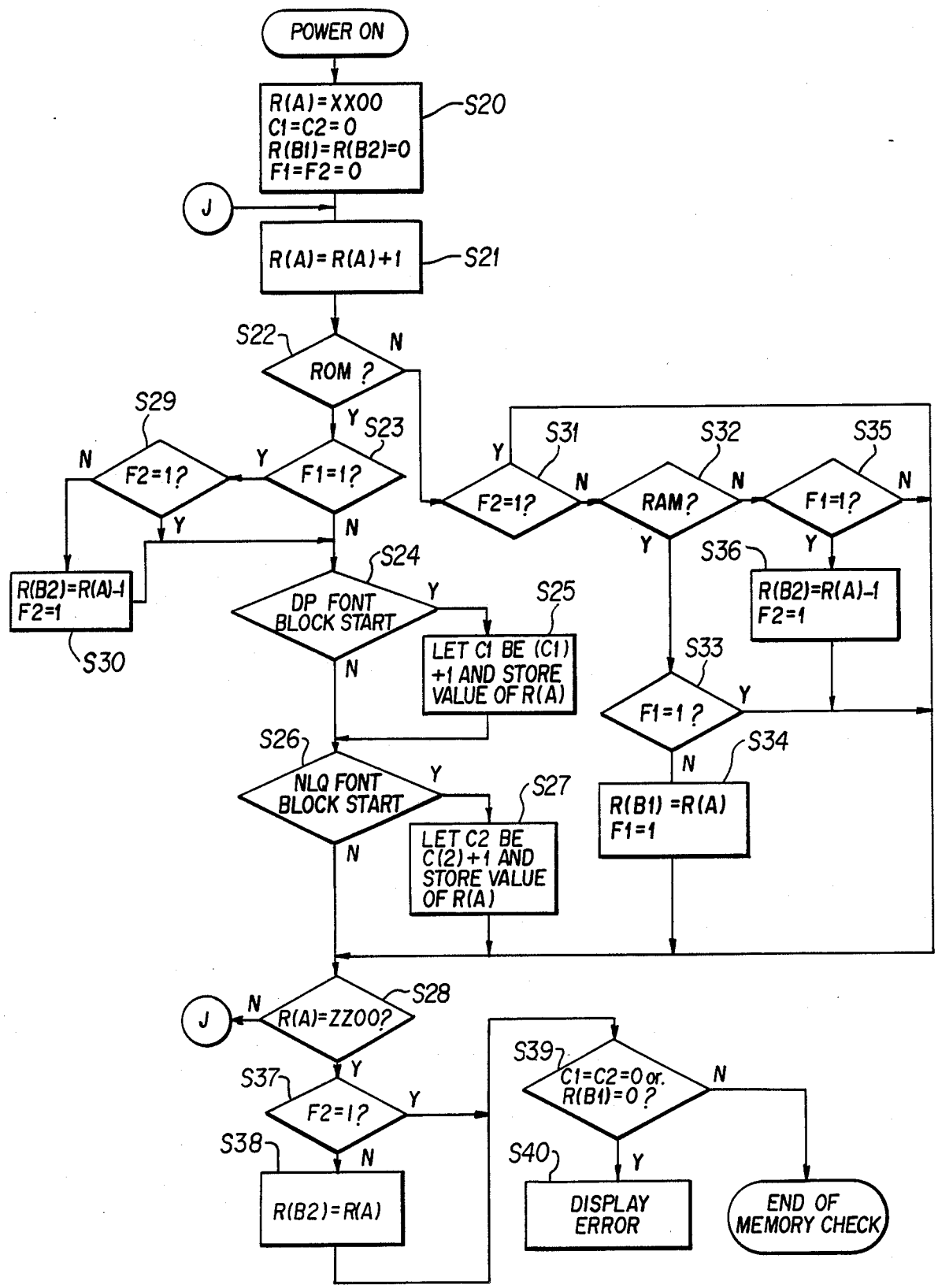
FIG. 3 is a flow chart of operation according to a second embodiment of the present invention.

A second embodiment of the present invention will be described with reference to a flow chart of FIG. 3. In the second embodiment, a single continuous address space is assigned to the character generator ROM 2, the buffer RAM 4 and the empty area 5. Upon energization of the printer, processing in FIG. 3 is performed. An identification code and a start address of each character set of each font, and start and end addresses of the buffer RAM 4 are detected and stored.

When the printer is powered, address XX00 immediately preceding the start address of the single continuous address space assigned to the character generator ROM 2, the buffer RAM 4 and the empty area 5 is set in the register R(A). The printing quality font counters C1 and C2 are set to "0" (in this embodiment, the DP and NLQ font counters C1 and C2 are prepared in the same manner as in the previous embodiment). A buffer start address register R(B1) and an end address register R(B2) are set to "0". Flags F1 and F2 are also set to "0" (step S20). The register R(A) is then incremented by one (step S21). The CPU checks in step S22 whether the ROM is mounted at the address represented by the value of the register R(A).

If YES in step S22, the CPU checks whether the flag F1 is set at logic "1". Since the flag F1 is initially set to logic "0", the CPU then checks whether the value of the register R(A) represents a DP font block start position (step S24) or an NLQ font block start position (step S26 as in the first embodiment. When the CPU detects a block start position, the corresponding counter C1 or C2 is incremented by one each. The value of the register R(A) is stored as the corresponding block start address (step S25 or S27). The CPU then checks in step S28 whether the value of the register R(A) represents end address ZZ00 of the single continuous address area for the character generator ROM 2, the buffer RAM 4 and the empty area 5 (step S28). If NO in step S28, the operations after step S21 are repeated.

However, if the CPU determines in step S22 that the ROM 2 is not mounted at the address represented by the value of the register R(A), the flow advances to step S31. The CPU then checks in step S31 whether the flag F2 is set at logic "1". Since the flag F2 is initially set at logic "0", the flow advances to step S32. The CPU checks in step S32 whether the RAM is mounted at the address and in step S35 whether the flag F1 is at logic "1". If NO in step S35, the flow advances to step S28, and the operations after step S21 are repeated.

However, if YES in step S32, the CPU checks in step S33 whether the flag F1 is set at logic "1". Since the flag F1 is initially set at logic "0", the flow advances to step S34. The value of the register R(A) is set in a buffer start address register R(B1), and the flag F1 is set at logic "1" (step S34). The start address of the buffer RAM 4 is stored in the buffer start address register R(B1), and the flag F1 is set at logic "1", thereby storing that the start address of the buffer RAM 4 is detected. The operations in steps S28, S21, S22, S31, S32 and S33 are repeated. Thereafter, when the CPU determines in step S32 that no RAM is mounted at the address represented by the value of the register R(A), the CPU checks whether the flag F1 is set at logic "1". In this case, if neither the RAM (step S22) nor the ROM (step S32) is mounted at the address, and the flag F2 is not set at logic "1", and the flag F1 is set at logic "1", the end of the buffer RAM can be now detected since the continuous address area is assigned to the buffer RAM 4 and the address of the buffer RAM 4 has been detected (flag F1 =1), and further the CPU has sequentially detected the presence of the RAM and now detects that no RAM is mounted at the address presented by the value of the register R(A). Subsequently, a value subtracted by one from the value of the register R(A) is stored in a buffer end address register R(B2). This operation is confirmed by the flag F2 (step S36). The operations in step S28 and after step S21 are repeated.

If NO in step S22 and the CPU determines in step S31 that the flag F2 is set at logic "1" (the end of detection of the buffer RAM 4), the flow advances from step S31 to step S28. The operations after step S21 are then repeated.

However, if YES in step S22 and the end of detection of the buffer RAM 4 is detected, the flags F1 and F2 have already been set both at logic "1". The operations after step S24 are performed via steps S23 and S29. When the CPU determines that the value of the register R(A) represents end address ZZ00 (step S28), the memory check is completed. In this case, if condition R(A) = Z00 is established, the CPU checks in step S37 whether or not the flag F2 is set at logic "1". This decision block is arranged to detect the buffer end address without performing the operations in steps S35 and S36 (step S28) when the buffer RAM 4 is allocated in the end address space. The CPU checks in step S37 whether the flag F2 is set at logic "1", which represents that the buffer end address is stored. If NO in step S37, the value of the register R(A), i.e., the end address is stored in the buffer end address register R(B2) and the flow advances to step S39. The CPU checks in step S39 whether both the counters C1 and C2 are set to "0" and the buffer start address register R(B1) is set to be "0". The fact that both the counters C1 and C2 are set to be "0" indicates that no character sets are detected (i.e., the character generator ROM 2 is not mounted in the printer). The fact that the buffer start address register R(B1) is set to be "0" indicates that the buffer RAM 4 is not mounted in the printer. In either case, error display is performed (step S40).

However, if NO in step S39, i.e., the counters C1 and C2 are not set to "0" and the buffer start address register R(B1) is not set to "0", memory check processing is completed.

The operation in step S30 will be described below. When the flags F1 and F2 are respectively logic "1" and logic "0" upon detection of the ROM (step S22), i.e., when the start address of the buffer RAM 4 is stored but the end address thereof is not stored, this indicates that no empty area is left after the buffer RAM 4 and that the area of the character generator ROM 2 is next to that of the buffer RAM 4. In other words, the address immediately preceding the detected address of the ROM 2 is the end address of the buffer RAM 4. In this case, a value subtracted by one from the value of the register R(A) is stored in the buffer end address register R(B2), and the flag F2 is set at logic "1". Thereafter, the operations after step S24 are performed.

According to the second embodiment, the single address space is assigned to the character generator ROM 2, the buffer RAM 4 and the empty area 5, and, upon energization of the printer, the character set identification code and the start address of the character set for each font and each printing quality, and the start and end addresses of the buffer RAM 4 are detected and stored, thereby controlling the printer. Therefore, the expansion of the character generator ROM 2 and the buffer RAM 4 can be easily and simply performed. In the second embodiment, the character generator ROM 2 and the buffer RAM 4 need not be mounted in the printer at the time of shipping in the same manner as in the first embodiment. The user can arbitrarily select any combination of a ROM and RAM for the empty area.

What is claimed is:

1. A method of utilizing a memory installed in a printer adapted to be connected with a host computer system wherein the memory receives and stores first and second data from said host computer system, said first data defining printing characteristics such as character format of the printer and said second data to be printed comprising the steps of:

detecting an energization of said printer;

assigning continuous address spaces to a character generator ROM, for generating respective fonts comprising different typefaces, a buffer RAM for storing said first and second data from said host system and an empty area in an address space of said memory, respectively, and assigning a continuous address space to said buffer RAM as a whole such that said character generator ROM and said buffer RAM sandwich said empty area in said continuous address spaces;

in response to said energization of said printer, sequentially searching said address spaces of said character generator ROM, said buffer RAM and said empty area; and detecting an identification code and a start address of each of a plurality of character sets stored in said character generator ROM, and start and end addresses of said buffer RAM, and storing said identification codes and said start addresses of said plurality of character sets and said start end addresses of said buffer RAM;

whereby said character generator ROM and said buffer RAM can be expanded in a continuous manner into said empty area.

2. A method according to claim 1, wherein a lower address area of said empty area is assigned to one of said character generator ROM and said buffer RAM, and an upper address area of said empty area is assigned to the other of said character generator ROM and said buffer RAM.

3. A method according to claim 2, wherein said buffer RAM is arranged such that said end address thereof serves as an end address of an address area of said character generator ROM, said buffer RAM and said empty area, and only said start address of said buffer RAM is searched.

4. A method according to claim 2, wherein said buffer RAM is arranged such that said start address thereof serves as a start address of an address area of said character generator ROM, said buffer RAM and said empty area, and only said end address of said buffer RAM is searched.

5. A method according to claim 1, wherein the empty area is formed with a continuous address space in said memory in said printer, and said character generator ROM and said buffer RAM are arbitrarily allocated in said empty area.

6. An apparatus for utilizing a memory installed in a printer adapted to be connected with a host computer system wherein the memory receives and stores first and second data from said host computer system, said first data defining printing characteristics such as character format of the printer and said second data to be printed, comprising:

means for detecting an energization of said printer;

memory means including a character generator ROM, for generating respective fonts comprising different typefaces, a buffer RAM for storing said first and second data from said host system and an empty memory area assigned continuous address areas respectively in a memory space in said memory means, said buffer RAM as a whole being assigned a continuous address area such that said character generator ROM and said buffer RAM sandwich said empty area in said continuous address spaces;

searching means for sequentially searching said address spaces of said character generator ROM, said buffer RAM and said empty area in response to said energization of said printer;

means for detecting an identification code and a start address of each of a plurality of character sets stored in said character generator ROM, and start and end addresses of said buffer RAM; and means for storing detection results from said detection means;

whereby said character generator ROM and said buffer RAM can be expanded in a continuous manner into said empty area.

7. The apparatus of claim 6 wherein said character generator ROM comprises a standard character generator ROM for generating respective fonts comprising different typefaces, said ROM mounted in said printer.

8. The apparatus of claim 6 wherein said character generator ROM comprises said standard character generator ROM with an expansion character generator ROM mounted in said printer.

9. The apparatus of claim 6 wherein said buffer RAM comprises a standard buffer RAM mounted in said printer.

10. The apparatus of claim 6 wherein said buffer RAM comprises a standard buffer RAM with an expansion buffer RAM mounted in said printer.

* * * * *